United States Patent [19]
MacDougall et al.

[11] Patent Number: 6,136,069
[45] Date of Patent: Oct. 24, 2000

[54] ZINCOALUMINOSILICATES OF THE FAU STRUCTURE

[75] Inventors: James Edward MacDougall, New Tripoli; Thomas Albert Braymer, Allentown; Charles Gardner Coe, Macungie, all of Pa.

[73] Assignee: Air Products and Chemicals, Inc., Allentown, Pa.

[21] Appl. No.: 09/454,745

[22] Filed: Dec. 6, 1999

Related U.S. Application Data

[62] Division of application No. 08/907,748, Aug. 8, 1997, Pat. No. 5,997,841.

[51] Int. Cl.$^7$ .................................................. B01D 53/047
[52] U.S. Cl. ...................... 95/90; 95/96; 95/130; 95/902
[58] Field of Search .................. 95/90, 96, 130, 95/902

[56] References Cited

U.S. PATENT DOCUMENTS

| | | |
|---|---|---|
| 3,415,736 | 12/1968 | Ciric . |
| 3,769,386 | 10/1973 | Rundell et al. ........................ 423/713 |
| 4,329,328 | 5/1982 | McAnespie et al. .................. 423/326 |
| 5,013,334 | 5/1991 | Maurer . |
| 5,070,052 | 12/1991 | Brownscombe et al. ................ 502/60 |
| 5,174,979 | 12/1992 | Chao et al. ............................. 423/715 |
| 5,258,058 | 11/1993 | Coe et al. ................................. 95/95 |
| 5,328,675 | 7/1994 | Vaughan et al. ....................... 423/326 |
| 5,366,720 | 11/1994 | Caglione et al. ...................... 423/713 |
| 5,419,891 | 5/1995 | Coe et al. ........................ 423/DIG. 21 |
| 5,675,050 | 10/1997 | Des Courieres et al. ............. 423/700 |

FOREIGN PATENT DOCUMENTS 0476901  3/1992  European Pat. Off. .

OTHER PUBLICATIONS

Cruceanu and Coworkers (A1.1 Cuza lasi, Sect. 1c, 1972 18(2) 223–9) (No Month).
Crystallization of low–silica faujasite (SiO$_2$/Al$_2$O$_3$~2.0)—Gunter H. Kuhl, Zeolites, vol. 7(5), pp. 451–457, Sep. 1987.

*Primary Examiner*—Mark L. Bell
*Assistant Examiner*—David Sample
*Attorney, Agent, or Firm*—Keith D. Gourley

[57] ABSTRACT

A method of separating a more strongly adsorbable component from one or more less strongly adsorbable components residing in a gaseous mixture comprising contacting the gaseous mixture at elevated pressure with a composition and adsorbing the more strongly adsorbed gas specie on the composition, wherein the composition is represented by the formula $$M^{n+}{}_{(2x+y)/n}[Si_{(2-x-y)}Al_{(y)}Zn_{(x)}]O_4;$$

wherein
M is cation selected from Groups 1, 2, 7, 10, 11, 12 and the f block elements as defined by the Periodic Table of the elements as adopted by IUPAC;
n is the valence of the selected cation; M;
x is greater than or equal to 0.02 but less than or equal to 1;
y is a value less than or equal to 0.98; and
2x+y is greater than or equal to 0.80;
wherein the composition of matter has a FAU structure and zinc resides in tetrahedral positions in the framework of the FAU structure.

6 Claims, No Drawings

ZINCOALUMINOSILICATES OF THE FAU STRUCTURE

CROSS-REFERENCE TO RELATED APPLICATIONS

This application is a divisional of copending U.S. patent application Ser. No. 08/907,748, filed on Aug. 8, 1997, now U.S. Pat. No. 5,997,841, of James Edward Mac Dougall, Thomas Albert Braymer and Charles Gardner Coe, entitled, "Zincoaluminosilicates of the FAU Structure", the Specification which is incorporated herein and made a part of this application.

STATEMENT REGARDING FEDERALLY SPONSORED RESEARCH OR DEVELOPMENT

Not applicable.

BACKGROUND OF THE INVENTION

Those skilled in the art of non-cryogenic gas separation continue to search for improved adsorbents which demonstrate higher capacity and selectivity. Molecular sieves such as crystalline microporous aluminosilicates possess cationic sites which are capable of physically adsorbing a more strongly adsorbable component of a gaseous mixture containing a more adsorbable component and one or more less adsorbable components. The gaseous mixture becomes depleted in the more adsorbable component providing a gaseous mixture which is enriched in the less strongly adsorbable components. A typical example of a gaseous mixture is air wherein the more adsorbable component is typically nitrogen and one of the less adsorbable components is oxygen.

Molecular sieves are broadly defined as materials which contain porosity at the molecular level and which adsorb differently sized molecules at different rates. Molecular sieves have a broad range of elemental compositions. One type of molecular sieve consists of metallosilicates which have a variety of structures. Depending on the elemental composition these metallosilicates can have a variety of empirical formulas but all consist of an extended crystalline lattice made up of tetrahedrally arranged silicate species forming an open framework structure. The majority of metallosilicates which behave as molecular sieves possess extra framework cations to balance the framework charge.

The most common example of metallosilicate molecular sieves are zeolites. Zeolites are aluminosilicates which can have a variety of Si/Al ratios in their crystalline composition. Both natural and synthetic zeolites are known and may generally be described by the following general formula:

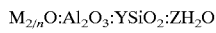

$M_{2/n}O:Al_2O_3:YSiO_2:ZH_2O$

Where M is a cation, n is its valence, Y is the moles of silica, and Z is the moles of water in the hydrated form. When the water of hydration is removed from the zeolite, highly porous materials are formed which have high internal surface area. Such zeolites can be used as catalysts, supports for metal-containing catalysts and as adsorbents. Zeolites in their hydrated form readily exchange their extra framework cations for other cations producing new cation forms of the zeolite. For this reason, zeolites can also be used as ion exchangers or detergent builders.

Crystalline aluminosilicates can also undergo isomorphous substitution with other elements expanding the range of compositions. Boron and Gallium have been substituted for aluminum in some zeolites. The degree of isomorphous substitution and the specific elements incorporated must be developed specifically for each type of zeolite. High degrees of isomorphous substitution in aluminum-rich zeolites has not been accomplished.

Aluminosilicate molecular sieves having high cation charge density such as calcium or lithium are known adsorbents suitable for use in processes for separating gaseous mixtures. The cation densities possible in aluminosilicates limit the adsorptive gas capacities at ambient and higher temperatures. This limitation occurs when the crystalline framework of such materials become saturated with aluminum. Aluminum saturation in crystalline aluminosilicates typically occurs when the mole ratio of silicon to aluminum is 1:1. This aluminum-rich composition in X-type zeolites is referred to as low silica X (LSX).

Those skilled in the art of molecular sieves are searching for ways to increase the framework charge beyond that possible in aluminosilicates so that higher cation densities are possible. The presence of such additional cations associated with open framework metallosilicates could increase gas capacity of the adsorbent for use in equilibrium-based gas separation applications.

EP-A-0476901 teaches a zeolite having a free aperature main channel of a size greater than 2.2 Å, a Si/Al molar ratio of less than 124/1 and zinc in the framework structure. Suitable zeolites are prepared by reacting together at least a source of silicon, a source of aluminum, a source of zinc, a source of alkali metal ions and a source of hydroxyl ions. Alternatively, suitable zeolites may be prepared by reacting a zeolite having a main channel of a size greater than 2.2 Å and a Si/Al molar ratio of less than 124/1 with a compound capable of removing aluminum or silicon from the framework structure and providing zinc ions for introduction into the framework structure in place of the aluminum or silicon.

EP-A-0476901 further states that the zeolites may be further modified by ion exchange with cations. When the ions to be introduced are zinc, such zinc ions are in an octahedrally coordinated form. The examples present zeolites which contain less than one zinc atom per unit cell (i.e. a molar ratio of Zn/Si≦0.008) and have less cations than required for charge compensation (1 for every Al and 2 for every Zn). Thus, one cannot assess whether zinc atoms have actually been incorporated into the framework of the zeolites described in the Specification.

Cruceanu and coworkers (Al.1 Cuza Iasi, Sect. 1c, 1972 18(2) 223–9) teach that zinc atoms may be incorporated into a zeolite outside the phase fields of either X or A zeolite. Such zeolites are prepared by using zinc acetate in a gel preparation process. The reference does not provide elemental compositions of the products and the adsorptive capacities are essentially the same for adsorbents which contain zinc and adsorbents which do not contain zinc.

U.S. Pat. No. 5,070,052 teaches compositions comprising a zeolite and zinc or a zinc plus an alkali metal and/or an alkaline earth metal compound wherein the sum of the amount of the zinc or zinc plus alkali metal and/or alkaline earth metal in the compound plus any metal cation exchanged in the zeolite is in excess of that required to provide a fully metal cation-exchanged zeolite. The catalyst is preferably activated before use as a catalyst by heating to 400° C. to 650° C., typically in a nitrogen or air atmosphere.

Methods are known for preparing aluminum-rich zeolites. For example, U.S. Pat. No. 5,366,720 teaches that low silica forms of faujasite-type zeolites can be prepared from more siliceous forms of the same zeolite species by contacting the starting zeolite with a highly caustic concentrated sodium aluminate solution at elevated temperatures. The process can be used to produce forms of zeolite X having $SiO_2/Al_2O_3$ molar ratios below 2.5.

BRIEF SUMMARY OF THE INVENTION

The present invention presents a new class of materials which demonstrate superior utility as adsorbents for use in gas separation applications. The compositions are represented according to Formula 1:

$$M^{n+}_{(2x+y)/n}[Si_{(2-x-y)}Al_{(y)}Zn_{(x)}]O_4;$$ Formula I wherein
M is cation selected from Groups 1, 2, 7, 10, 11, 12 and the f block elements as defined by the Periodic Table of the elements as adopted by IUPAC;
n is the valence of the selected cation; M;
x is greater than or equal to 0.02 but less than or equal to 1;
y is greater than 0 but less than or equal to 0.98; and
2x+y is greater than or equal to 0.80;
wherein the composition of matter has the FAU structure and the composition exhibits an X-ray diffraction pattern in which at least the following reflections (hkl) occur with the intensity $(I/I_o)$ at the stated d-spacings $(d_{hkl})$:

| h | k | l | Intensity $I/I_0$ | d-spacings ($d_{hkl}$) |
|---|---|---|---|---|
| 1 | 1 | 1 | very strong | 14.45 |
| 2 | 2 | 0 | strong | 8.85 |
| 3 | 3 | 1 | moderate | 5.75 |
| 5 | 3 | 3 | moderate | 3.82 |
| 5 | 5 | 5 | moderate | 2.89 |

FAU is a recognized structure code established by the Structure Commission of the International Zeolite Association, as set forth at page 96 of the Atlas of Zeolite Structure Types by W. M. Meier and D. H. Olson (1992), published by Butterworth-Heinemann on behalf of the Commission. Structure types do not depend on the composition, distribution of framework atoms, cell dimensions, or symmetry.

Applicants have discovered that molecular sieves which have the same number of cations as zeolites and which contain Zn in the framework and consequently less Al show improved properties for selective gas adsorption.

Applicants have further discovered that the compositions according to Formula I can be readily prepared according to the methods presented in this patent application such that M is a mixture of at least two of the cations selected from Groups 1, 2, 7, 10, 11, 12 and the f block elements as defined by the Periodic Table of the elements as dopted by IUPAC. Preferably one of the mixture of at least two cations presented by M is lithium and optimal utility for gas separation applications is achieved when the mixture of at least two cations comprises at least 50 mole percent lithium. Preferably the compositions according to Formula 1 are possessed of a stoichiometry wherein x ranges from 0.02 to 0.20 and y ranges from 0.80 to 0.98.

More preferred compositions of the present invention are presented in Formula II:

$$M^{n+}_{(2x+y)/n}[Si_{(2-x-y)}Al_{(y)}Zn_{(x)}]O^4;$$ FORMULA II wherein
M is a cation selected from the group consisting of lithium, potassium, calcium, magnesium, zinc, nickel, manganese, lanthanum, cerium and praseodymium;
n is the valence of the selected cation;
x is greater than or equal to 0.02 but less than or equal to 1;
y is greater than 0 but less than or equal to 0.98;
2x+y is greater than or equal to 0.80;
wherein the composition of matter has the FAU structure and the composition exhibits an X-ray diffraction pattern as described under the description to Formula 1.

Applicants have further discovered that the compositions according to Formula II can be readily prepared according to the methods presented in this patent application such that M is calcium or M is a mixture of at least two cations selected from the group consisting of lithium, potassium, calcium, magnesium, zinc, nickel, manganese, lanthanum, cerium and praseodymium. Preferably one of the mixture of at least two cations presented by M is either calcium or lithium and optimal utility for gas separation applications is achieved when the mixture of at least two cations comprises at least 50 mole percent of either calcium or lithium. Preferably, the compositions according to Formula II are possessed of a stoichiometry wherein x ranges from 0.02 to 0.20 and y ranges from 0.80 to 0.98.

Most preferred compositions according to the present invention are presented in Formula III:

$$Li_{(2x+y)}[Si_{(2-x-y)}Al_{(y)}Zn_{(x)}]O_4;$$ Formula III wherein
x is greater than or equal to 0.02 but less than or equal to 1;
y is greater than 0 but less than or equal to 0.98;
2x+y is greater than or equal to 0.80; and
wherein the composition of matter has the FAU structure and the composition exhibits an X-ray diffraction pattern an X-ray diffraction pattern as described under the description to Formula I.

The compositions according to Formulae I, II and III can be conveniently prepared by practicing either a gel based process or a post modification process. The first process employs a gel according to the steps comprising:

(a) mixing a source of zinc, a source of aluminum, a source of silicon, water and sodium hydroxide to form a precursor gel, the proportions of the source of zinc, the source of aluminum and the source of silicon being those required to produce a desired sodium zincoaluminosilicate having the FAU structure wherein the molar ratio of the sodium hydroxide to the source of silicon is greater than 4;

(b) reacting the precursor gel with from 0.1 to about 10 percent by weight of a crystallization directing agent based upon the theoretical yield of the desired sodium zincoaluminosilicate at a temperature ranging from 40° C. to 100° C. to form a sodium zincoaluminosilicate reaction mixture;

(c) heating the reaction mixture for an amount of time sufficient to form a mother liquor containing the sodium zincoaluminosilicate of the FAU structure; and (d) separating the mother liquor containing the sodium zincoaluminosilicate to collect the sodium zincoaluminosilicate.

The product obtained at the end of step (d) is a sodium zincoaluminosilicate which can be used in a variety of applications including catalytic applications. The sodium zincoaluminosilicates can be readily converted to a corresponding ion exchanged product by practicing the following additional steps:

(e) washing the sodium zincoaluminosilicate with 0.01 to 0.25 molar sodium hydroxide; and (f) exchanging at least 50 percent of sodium present in the sodium zincoaluminosilicate with a source of one or more cations selected from Groups 1, 2, 7, 10, 11 12 and the f block elements as defined by the Periodic Table of the elements as adopted by IUPAC to yield an exchanged zincoaluminosilicate.

A second and preferable process of preparing the compositions according to Formulae I, II and III employs a post modification procedure comprising the steps of:

(a) contacting a crystalline aluminosilicate of the FAU structure with a source of zinc in the presence of sodium hydroxide wherein the molar ratio of the sodium hydroxide to the source of zinc is between 5 and 7 at a temperature ranging from 40° to 100° C. to form a mother liquor containing the sodium zincoaluminosilicate of the FAU structure; and (b) separating the mother liquor containing the sodium zincoaluminosilicate to collect the sodium zincoaluminosilicate.

The product obtained at the end of step (b) of the post modification method is a sodium zincoaluminosilicate which can be used in a variety of applications including catalytic applications. The sodium zincoaluminosilicates can be readily converted to a corresponding ion exchanged product by practicing the following additional steps (c) washing the sodium zincoaluminosilicate with 0.01 to 0.25 molar sodium hydroxide; and (d) exchanging at least 50 percent of sodium present in the sodium zincoaluminosilicate with a source of one or more cations selected from Groups 1, 2, 7, 10, 11 12 and the f block elements as defined by the Periodic Table of the elements as adopted by IUPAC to yield an exchanged zincoaluminosilicate.

The present invention is also a method of separating a more strongly adsorbable component of a gaseous mixture from one or more less strongly adsorbable components with respect to the adsorbent employed in the method. The method comprises contacting the gaseous mixture at elevated pressure with an adsorbent represented by the compositions according to Formulae I, II and III and adsorbing the more strongly adsorbable component onto the adsorbent thereby providing an effluent which is depleted in the more adsorbable component.

Preferably, the method comprising the steps of:

a) contacting the enumerated gaseous mixture with an adsorbent according to Formulae I, II or III at an elevated pressure and adsorbing the more adsorbable component onto the adsorbent while allowing the less strongly adsorbable components to be recovered or passed to waste;

b) terminating the contacting step and reducing the pressure on the adsorbent to desorb the more strongly adsorbable component from the adsorbent;

c) repressurizing the adsorbent with the more adsorbable component; and d) repeating steps a)–c) to provide a continuous process.

Preferably, the gaseous mixture is air wherein the more strongly adsorbable component is nitrogen and the less strongly adsorbable component is oxygen. Preferably, the adsorbent is contained in a plurality of parallel connected adsorption vessels and the steps are performed in each vessel so that when at least one vessel is performing step a), at least one other vessel is performing steps b) and/or c). Preferably, the plurality of vessels is at least two. Preferably, between step a) and step b), one vessel pressure equalizes with the other vessel.

The present invention presents zincoaluminosilicates which have high cation content such that the enumerated compositions provide unexpectedly superior utility in gas separation applications, as will be set forth in greater detail below.

DETAILED DESCRIPTION OF THE INVENTION

The compositions according to Formulae I, II and III shall be referred to as zincoaluminosilicates. Such zincoaluminosilicates are not in the public domain and can now be prepared based upon Applicants' discovery of novel preparative methods. Such preparative methods are capable of introducing a greater amount of zinc into the tetrahedral positions in the framework of an aluminosilicate at equal framework aluminum levels than was possible according to prior art processes.

Upon introducing a greater amount of zinc into the aluminosilicate framework than was possible in prior art processes, the framework charge is increased, thus requiring more compensating cations in order to achieve charge neutrality in the adsorbent. This result is achieved because zinc has a valence of 2 and aluminum has a valence of 3. Therefore, a net increase in overall framework charge occurs when a zinc atom takes the place of either an aluminum atom or silicon atom within the framework of the aluminosilicate. Due to the increase in framework charge, the compositions of the present invention possess additional amounts of effective extra framework cations over the prior art compositions and such additional extra framework cations are capable of providing enhanced utility in gas separation applications.

The zincoaluminosilicates having the FAU structure according to Formulae I, II and III can have varying amounts of aluminum. The FAU structure is a structural type recognized by the Structure Commission of the International Zeolite Association, as set forth at page 96 of the Atlas of Zeolite Structure Types by W. M. Meier and D. H. Olson (1992) published by Butterworth-Heinemann on behalf of the Commission.

Known aluminosilicates having the FAU structure include zeolites X and LSX. LSX contains the most aluminum allowed in an aluminosilicate and represents an effective adsorbent for gas separation applications. LSX has 96 Al and 96 Si tetrahedral atoms. To balance the charge, 96 monovalent cations must be present. If all the trivalent Al atoms were replaced by divalent Zn tetrahedral atoms, 192 monovalent cations would be required to balance charge.

The preparative methods and the compositions afforded by Applicants' claimed processes also provides a way to increase the cation density above what is possible for aluminosilicates of the FAU structure. Aluminosilicates are limited to having a Si/Al ratio greater than or equal to 1 according to Loewenstein's rule which states that Al—O—Al bonding is unfavorable when Al is in tetrahedral coordination, as in the case of aluminosilicates. There are no examples of open framework materials containing Al—O—Al bonds.

The compositions according to Formulae I, II and III show increased cation contents compared to the compositions presented in EP-A-0476901. The examples presented in EP-A-0476901 illustrate that the amount of framework zinc is reduced to less than one zinc atom per unit cell as the amount of Al and consequently the cation content per unit cell is increased. In contrast, the compositions of the present invention allow for an increase in zinc content while avoiding a decrease in total cation content.

This concept is illustrated in Table I which presents the zinc containing zeolites disclosed in EP-A-0476901. The column entitled, "Prior Art Composition" provides the normalized molar ratios of the aluminum, silicon, zinc and sodium for each of the enumerated adsorbents disclosed in EP-A-0476901. The column entitled, "Composition According to $M^{n+}_{(2x+y)/n}[Si_{(2-x-y)}Al_{(y)}Zn_{(x)}]O_4$" presents the compositions of EP-A-0476901 in the format according to the appended claims of the present application. Upon comparing the compositions of EP-A-0476901 with the compositions of Applicants' claimed invention, one observes that the compositions of EP-A-0476901 fall outside of the bounds of Applicants' claimed compositions. Applicants' claimed preparative methods provide a route to incorporate a greater amount of zinc into an aluminosilicate while retaining higher cation content than is obtainable by practicing the methods presented in EP-A-0476901.

the like. The mixing step can be conducted at room temperature or elevated temperature.

The precursor gel is then reacted with a crystallization directing agent (CDA) to form a sodium zincoaluminosilicate reaction mixture. Suitable reaction conditions include a temperatures ranging from 40° to 100° C. Typical reaction times range from 3 hours to 3 days depending upon the particular composition being prepared and the temperature of reaction. Optimum reaction conditions can be readily assessed without undue experimentation.

The term CDA refers to a nucleating agent which directs the specific formation of a desired structure type. For the purposes of the materials of this invention, suitable CDAs including any nucleating which is capable of producing a crystalline product having the FAU structure. Suitable CDAs may be utilized in either the solid form or as a solution as is acknowledged in the literature. A representative and preferred CDA is a composition in solution which is described in U.S. Pat. No. 4,166,099 and has a molar composition of $15\pm2 Na_2O$, $1 Al_2O_3$, $14\pm2 SiO_2$ and $350\pm50$ $H_2O$ prepared by mixing the ingredients at a temperature at or below about 35° C. and aging the mixture at a temperature at or below about 25° C. for at least two hours.

TABLE I (Prior Art)
Summary of EP-A-0476901 Examples

| | Prior Art Composition | | | | Prior Art Composition Presented According to the Formulae of the Present Invention $Na_{2x+y}[Si_{2-x-y}Al_{y}Zn_{x}]O_4$* | | | | |
|---|---|---|---|---|---|---|---|---|---|
| Absorbent | Al | Si | Zn | Na | Al y | Si [2 − x − y] | Zn x | Na actual (2x + y) | Na theoret. (2x + y)** |
| ZNS-5 | 1 | 1.76 | 0.05 | 1.06 | 0.712 | 1.253 | 0.036 | 0.754 | 0.783 |
| ZNS-50 | 1 | 2.44 | 0.18 | 1.27 | 0.552 | 1.348 | 0.099 | 0.702 | 0.751 |
| ZNS-51 | 1 | 2.04 | 0.08 | 1.08 | 0.641 | 1.308 | 0.051 | 0.692 | 0.744 |
| Linde 13X | 1 | 1.25 | — | 1.01 | | | | | |
| ZNS-36 | 1 | 1.23 | 0.006 | 0.95 | 0.894 | 1.100 | 0.005 | 0.850 | 0.905 |
| ZNS-41 | 1 | 1.24 | 0.008 | 0.95 | 0.890 | 1.103 | 0.007 | 0.845 | 0.904 |
| Zeolite Y | 1 | 2.44 | — | 0.96 | | | | | |
| ZNS-37 | 1 | 2.22 | 0.14 | 1.14 | 0.595 | 1.321 | 0.083 | 0.679 | 0.762 |
| ZNS-42 | 1 | 1.87 | 0.14 | 1.11 | 0.664 | 1.243 | 0.093 | 0.738 | 0.850 |

**Theoretical

The compositions recited in Formulae I, II and III can be readily prepared by practicing either of Applicants' claimed preparative methods, the first method which shall be referred to as a gel method and the second method which shall be referred to as a post modification method.

The gel preparative method comprises mixing a source of zinc, a source of aluminum, a source of silicon, water and sodium hydroxide to form a precursor gel. The proportions of the source of zinc, the source of aluminum and the source of silicon can be readily deduced by one of ordinary skill in the art in order to produce a sodium zincoaluminosilicate having a desired composition according to the present invention. A key feature of this step consists of carefully controlling the molar ratio of sodium hydroxide to the source of silicon such that the molar ratio is greater than 4.

The sources of zinc include any zinc compound which solubilizes in sodium hydroxide solution. A preferred source of zinc is zinc oxide. The source of aluminum may be sodium aluminate, metakaolin, alumina, hydrated alumina, aluminum alkoxides or the like. Suitable sources of silicon include sodium silicate, colloidal silica, silicon alkoxides or The sodium zincoaluminosilicate reaction mixture is heated for an amount of time sufficient to form a mother liquor containing the sodium zincoaluminosilicate of the FAU structure. Thereafter, the mother liquor containing the sodium zincoaluminosilicate is separated to collect the sodium zincoaluminosilicate. The product crystals may be recovered using conventional methods such as filtration or centrifugation. The crystals may then be dried.

The sodium zincoaluminosilicates can be readily converted to a corresponding ion exchanged product by practicing the following additional steps of washing the sodium zincoaluminosilicate with 0.01 to 0.25 molar sodium hydroxide followed by exchanging at least 50 percent of sodium present in the sodium zincoaluminosilicate with a source of one or more cations selected from Groups 1, 2, 7, 10, 11 12 and the f block elements as defined by the Periodic Table of the elements as adopted by IUPAC to yield an exchanged zincoaluminosilicate.

Suitable sources of one or more cations of the enumerated elements comprise soluble metal halides, sulfates or nitrates of the respective elements.

A second and preferable method of preparing the compositions according to Formulae I, II and III employs a post modification procedure. The first step of the procedure consists of contacting a crystalline aluminosilicate of the FAU structure with a source of zinc in the presence of sodium hydroxide wherein the molar ratio of the sodium hydroxide to the source of zinc is between 5 and 7 at a temperature ranging from 40° to 100° C. to form a mother liquor containing the sodium zincoaluminosilicate of the FAU structure.

Suitable crystalline aluminosilicates of the FAU structure include known compositions such as those disclosed in U.S. Pat. Nos. 2,882,244 and 3,130,007. Preferred aluminosilicates of the FAU structure are those presented in copending U.S. patent application Ser. No. 08/908,868, entitled, "Faujasite Adsorbents with Nonuniform Al Distribution", assigned to Air Products and Chemicals, Inc., filed on the same date as the present patent application. The aluminosilicates presented in the copending patent application have a faujasite structure with a Si/Al ratio in the range of approximately 1.05 to 1.26 and where the number of silicon atoms with four next nearest neighbor silicon atoms is greater than the number of silicon atoms with three next nearest neighbor silicon atoms and one next nearest neighbor aluminum atom, and there are β cages which contain 12 Al atoms and there are β cages which contain 10 or less Al atoms in said zeolite. Such aluminosilicates can be readily identified by the $^{29}$Si nuclear magnetic resonance spectrum which has a Si(0Al) peak of greater area than its Si(1Al) peak. Such aluminosilicates preferably have a Si/Al ratio of approximately 1.15 to 1.20.

The aluminosilicates of the copending patent application can be prepared by crystallizing the aluminosilicate from a mixture of alkali metal aluminate and alkali metal silicate wherein the mixture has an alkali metal oxide to silica ratio of at least 1.6 and water to alkali metal oxide ratio of at least 37. A preferred alkali metal aluminate is sodium aluminate and a preferred alkali metal silicate is sodium silicate.

The mother liquor containing the sodium zincoaluminosilicate of the FAU structure is then separated by the steps previously discussed in the gel preparative method to collect the resulting crystalline sodium zincoaluminosilicate. Such sodium zincoaluminosilicate can be readily converted to a corresponding ion exchanged product by washing the sodium zincoaluminosilicate with 0.01 to 0.25 molar sodium hydroxide; and exchanging at least 50 percent of sodium present in the sodium zincoaluminosilicate with a source of one or more cations selected from Groups 1, 2, 7, 10, 11 12 and the f block elements as defined by the Periodic Table of the elements as adopted by IUPAC to yield an exchanged zincoaluminosilicate.

More preferably, the sodium zincoaluminosilicate prepared by the post modification method is ion exchanged with at least 50 percent of a cation selected from the group consisting of lithium, potassium, calcium, magnesium, zinc, nickel, manganese, lanthanum, cerium and praseodymium. Most preferably the sodium zincoaluminosilicate is ion exchanged with at least 50 percent lithium.

The invention will now be described in more detail though only by way of illustration in the following examples and evaluations.

EXPERIMENTAL SECTION

In each of the following examples, parts and percentages are given by weight and temperature is given in degrees Centigrade unless otherwise stated. A number of techniques were used in concert to confirm than zinc was incorporated into the framework of the subject zincoaluminosilicates. Initially, the presence of framework zinc was confirmed by observing a downfield shift of about 5 ppm in the $^{29}$Si Nuclear Magnetic Resonance (NMR) spectrum. This shift is consistent with reported data for zincosilicates. Infrared spectroscopy (IR) was also utilized to confirm the presence of zinc in the framework and the elemental analysis showed the correct number of extra framework cations assuming that zinc was incorporated into the framework.

Table II presents a summary of the compositions prepared according to Examples 1 through 7 wherein x, y and M are values according to Formula 1. The Examples are presented in detail hereunder.

TABLE II

Example Summary

| Ex | Reaction Type | Qualifier | Work Up | Product | x | y | M |
|---|---|---|---|---|---|---|---|
| 1 | Gel | with CDA | base wash | FAU + trace LTA | 0.087 | 0.818 | 0.99 |
| 2 | Gel | without CDA | no base wash | SOD + amorphous | NA | NA | NA |
| 3A | EP-A-0476901 | | no base wash | FAU + trace amorphous | 0.059 | 0.695 | 0.79 |
| 3B | Li Exchange of Example 3A | | | FAU + trace amorphous | 0.059 | 0.689 | (0.72) Li + Na |
| 4 | Post-Modification | | basewash | FAU + minor amorphous | 0.14 | 0.844 | 1.10 |
| 5A | Post-Modification | | base wash | FAU | 0.03 | 0.960 | 1.00 |
| 5B | Li Exchange of Example 5A | | | FAU | 0.03 | 0.960 | 1.00 |
| 6A | Post-Modification | | base wash | FAU | 0.04 | 0.92 | 1.00 |
| 6B | Li Exchange of Example 6A | | | FAU | 0.04 | 0.92 | 0.86 |
| 7A | Post-Modification | | | FAU | 0 | 0.92 | 0.92 |
| 7B | Li Exchange of Example 7A | | | FAU | 0 | 0.92 | 0.86 |

TABLE II-continued

Example Summary

| Ex | Reaction Type | Qualifier | Work Up | Product | x | y | M |
|---|---|---|---|---|---|---|---|
| 8 | Ca xchange of LSX | | | CaLSX | 0 | 1.0 | 0.5 |
| 9 | Ca zinco-aluminosilicate | | base wash | FAU | 0.05 | 0.95 | 0.50 |

FAU = faujasite structure,
LTA = zeolite A,
SOD = sodalite type.

EXAMPLE 1

Preparation of $Na_{0.99}[Si_{1.10}Al_{0.818}Zn_{0.087}]O_4$ By Gel Preparation Method Using CDA and Base Wash Step This example illustrates a composition of the present invention which was prepared using the gel preparation method wherein a CDA was employed as well as a base washing step. The CDA had a batch composition of 16 $Na_2O:Al_2O_3$:17 $SiO_2$:350 $H_2O$, and was prepared by mixing two solutions. The first solution, A, contained 3.48 g of aluminum hydroxide hydrate (51% by weight $Al_2O_3$), 2.5 g 97% NaOH, and 54.0 g of deionized water. This mixture gave a clear solution with shaking. The clear solution was cooled in an ice bath. The second solution, solution B, was prepared by dissolving 12.55 g 97% NaOH in 13.5 g deionized water, and adding 61.97 g of a sodium silicate solution (24.42% $SiO_2$, 8.80% $Na_2O$, and 62.78% $H_2O$). Solution B was cooled in an ice bath. After about 20 minutes, solution A was added to solution B. Initially the mixture was cloudy, but quickly became clear. This mixture comprising the CDA was stirred in an ice bath for two hours and was then allowed to stand at room temperature for 6 hours prior to use.

The gel had a composition of 11.0 $Na_2O:Al_2O_3$:5.0 $SiO_2$:1.33 ZnO:315 $H_2O$. The gel was also prepared by mixing two solutions. Solution #1 was a mixture 25.0 g of 97% NaOH, 5.41 g ZnO and 50.0 g deionized water, and 53.29 g sodium silicate solution (24.42% $SiO_2$, 8.80% $Na_2O$, and 62.78% $H_2O$). Solution #2 was mixture of 10.14 g aluminum hydroxide hydrate (51% by weight $Al_2O_3$), 12.92 g 97% NaOH, and 79.5 g deionized water. The gel was formed by adding solution #2 to solution #1 followed by shaking to homogenize. 5.0 g of the CDA was immediately added to the gel. This final mixture was homogenized by shaking and crystallized at 75° C. for 5 days. The solid was recovered by centrifugation and washed with about 150 g of 0.25M NaOH solution instead of deionized water. The centrifugation and washing were repeated twice and the solid was dried at 75° C. overnight. The material was characterized by X-ray diffraction. The X-ray diffraction pattern was that of a highly crystalline FAU with a trace of LTA (zeolite A) and a very minor amount of amorphous material. $^{29}Si$ NMR spectroscopy was used to measure the framework composition which was 1.22. Bulk analysis gave the following composition, $Na_{0.99}[Si_{1.10}Al_{0.818}Zn_{0.087}]O_4$.

EXAMPLE 2 (Comparative)

Preparation of Sodium Zincoaluminosilicate By Gel Preparation Method Without Using a CDA and Without Base Wash Step This is a comparative example showing the criticality of using a CDA to prepare compositions of the present invention. As shall be shown, a dense phase forms when a CDA is not employed. A gel composition 11 $Na_2O:Al_2O_3$:4 $SiO_2$:0.67 ZnO:180 $H_2O$ was prepared by dissolving 39.22 g 97% NaOH in 135.9 g deionized water, adding 2.73 g ZnO and 10 g aluminum hydroxide hydrate (51% by weight $Al_2O_3$). When all the solids had dissolved, 41.80 g sodium silicate solution (28.71% $SiO_2$, 8.86% $Na_2O$ and 62.43% $H_2O$) was added. A gel formed and the mixture was allowed to crystallize at 75° C., for 2 days producing a clear solution and solid product. The mixture was homogenized and one half was recovered by filtration and washed with deionized water. X-ray diffraction showed that the solid product was a mixture of sodalite and amorphous material. The remaining half of the mixture was allowed to crystallize for an additional 11 days. After 13 days total, the solid product was recovered by filtration and washed with deionized water. X-ray diffraction analysis showed the solid product was a mixture of sodalite and amorphous material. No compositions possessing the FAU structure were obtained according to this method which did not utilize a CDA or a base washing step.

EXAMPLE 3A (Comparative)

Preparation of $Na_{0.79}[Si_{1.24}Al_{0.695}Zn_{0.059}]O_4$

This comparative preparation illustrates a composition prepared according to the procedure of Example 1 of EP-A-0476901. A gel having the composition 4.89 $Na_2O$:0.44 ZnO:1 $Al_2O_3$:11.1 $SiO_2$:160 $H_2O$ was prepared by first dissolving 7.5 g NaOH and 1.1 g ZnO in 7.8 g deionized water. When all the ZnO had dissolved, 50.79 g deionized water and 15.4 g sodium aluminate ($Na_2O:Al_2O_3$. 5 $H_2O$) were added to yield a clear yellow solution when the sodium aluminate dissolved. This solution was added to 48.5 g colloidal silica (40 weight % $SiO_2$), causing a gel to form. Following shaking to homogenize the gel, the gel was allowed to stand at room temperature for about 24 hours. After 24 hours at room temperature, the mixture was crystallized at 100° C. for 1 week. The resulting solid was separated from the liquid present by vacuum filtration and washed with deionized water. The solid air dried and an X-ray diffraction pattern was recorded. The X-ray diffraction pattern was consistent with a crystalline FAU structure, with a minor amount of amorphous material present. Bulk analysis gave the following in relation to Formula I: $Na_{0.79}Zn_{0.059}Al_{0.695}Si_{1.24}O_4$. This result is comparable to that reported in EP-A-0476901 for ZNS-50.

EXAMPLE 3B (Comparative)

Preparation of $Li_{0.61}Na_{0.11}[Si_{1.25}Al_{0.688}Zn_{0.059}]O_4$

Li exchange and adsorption testing of Example 3A were conducted to evaluate the utility of the composition as a gas separation adsorbent. This was accomplished by slurrying 10 g of the solid produced in Example 3A in 1M LiCl solution with a solution to solid ratio of about 45 cc/g, heating at 100° C. overnight, recovering the solid by vacuum filtration followed by washing with deionized water. This procedure was repeated to give a total of 5 contacts of LiCl with the solid. Bulk analysis gave a composition of $Li_{0.61}Na_{0.11}Zn_{0.059}Al_{0.688}Si_{1.25}O_4$. The solid was heated to remove water to 400° C., at a heating rate of ~1° C. per minute, with 60 minute holds at 100, 200, 250° C. and a final hold at 400° C. for about 12 hours. This example demonstrates that the prior art methods are not capable of preparing the compositions according to Formulae I, II or III.

The compositions of Example 3A and 3B were tested for use as adsorbents in processes for selectively removing a more adsorbable component from one or more less adsorbable components in a gaseous mixture. $N_2$ and $O_2$ adsorption isotherms were obtained at 23° C., and the gas capacities at 1 atmosphere, 23° C. in millimoles/g are listed in Table III.

TABLE III

Adsorption capacities for prior art adsorbents

| Example | Ion form | x | y | 2 − x − y | $M^+$ (2x + y) | M actual | $N_2$ | $O_2$ |
|---|---|---|---|---|---|---|---|---|
| ZNS-50 * | Na | 0.099 | 0.552 | 1.379 | 0.751 | 0.702 | NA | NA |
| 3A | Na | 0.059 | 0.695 | 1.246 | 0.814 | 0.79 | 0.40 | 0.15 |
| 3B | Li | 0.059 | 0.689 | 1.252 | 0.802 | 0.72 | 0.37 | 0.13 |

* as reported in EP-A-0476901

Referring to Table III, the first entry of the Table presents a composition ZNS-50 which was presented in EP-A-0476901. However, EP-A-0476901 reports no gas adsorption data for ZNS-50 or any of the zinc containing aluminosilicates presented therein. Applicants prepared the composition according to Example 3A in order to assess the adsorptive capacity of a representative composition according to EP-A-0476901. Example 3A shows that the subject zincoaluminosilicate in the sodium form demonstrates a gas capacity comparable to prior art aluminosilicates in the sodium form. Example 3B was prepared in order to assess the change in gas capacity which results when the composition of Example 3A is exchanged with lithium. Example 3B demonstrates that lithium exchange of a composition of the type presented in EP-A-0476901 results in a slight decrease in gas capacity. Stated alternately, lithium exchange of the composition of Example 3A did not result in improved gas capacity.

EXAMPLE 4

Preparation of $Na_{1.10}[Si_{1.02}Al_{0.844}Zn_{0.14}]O_4$ Using the Post-Modification Method with NaY This example illustrates a composition of the present invention prepared using the post-modification method in combination with a base (alkaline) wash. 10 g of commercial Na zeolite Y purchased from Union Carbide Corporation as material LZY-54 (having a bulk composition of 23.70 weight % Si, 18.51 weight % Al, 7.51 weight % Na, 18.59 weight % $H_2O$) was reacted with a 20 g of 1M $Na_6ZnO_4$ solution at 100° C. for 3.5 days. The solid was recovered by vacuum filtration and washed with 0.05M NaOH solution rather than deionized water. X-ray diffraction of the resulting solid confirmed the FAU structure with a minor amount of amorphous material present. $^{29}Si$ NMR was used to measure the framework composition was 1.78. Thus, the framework composition was substantially different from the framework composition of 2.64 for the parent Y material. A down field shift in the overall envelope of the spectrum was observed which is consistent with observations made for crystalline zincosilicates. Bulk analysis by Atomic adsorption/Ion coupled plasma(AA/ICP) spectroscopy gave the following composition in relation to Formula I: $Na_{1.10}[Si_{1.02}Al_{0.844}Zn_{0.14}]O_4$.

EXAMPLE 5A

Preparation of $Na_{1.01}[Si_{1.02}Al_{0.95}Zn_{0.03}]O_4$ Using the Post Modification Method With Base Washing Step This example illustrates a composition of the present invention which was prepared using the post-modification method and base washing step wherein a sodium aluminosilicate having the FAU structure of the type presented in the previously discussed copending U.S. patent application Ser. No. 08/908,868, filed on the same date as the present patent application was used. A sodium aluminosilicate gel having a composition 7.20 $Na_2O:Al_2O_3:3$ $SiO_2:411.5$ $H_2O$ was prepared. (The ratio of $Na_2O:SiO_2$ was 2.40, and the ratio of $H_2O:Na_2O$ was 57.2.) Sodium meta silicate ($Na_2SiO_3.5$ $H_2O$) 309.74 g, was dissolved in 1372.8 g deionized water. A second solution was prepared by dissolving 91.66 g sodium aluminate (54.08% $Al_2O_3$, 41.66% $Na_2O$) and 117.11 g 97% NaOH in 1224.0 g deionized water. When all the solids had dissolved, the sodium aluminate solution was added to the sodium silicate solution, and an additional 835.0 g deionized water was added. This mixture formed a gel, which was homogenized by shaking. The gel was crystallized at 100° C. for about 5 days. At that time a clear aqueous phase was present above a white solid. The solid was recovered by vacuum filtration and washed with deionized water. An X-ray diffraction pattern was recorded for the air dried sample and was consistent with the FAU structure as summarized below. A $^{29}Si$ NMR spectrum was obtained. In this case, the peak area associated with Si tetrahedral atoms having no Al next nearest neighbors [Si(0Al)] was greater than the peak area associated with Si tetrahedral atoms having 1 Al next nearest neighbor [Si(1Al)].

| Summary of NMR Spectrum | | | | | |
|---|---|---|---|---|---|
| Si/Al | Si(4Al) | Si(3Al) | Si(2Al) | Si(1Al) | Si(0Al) |
| 1.18 | 65.38 | 21.11 | 5.84 | 3.02 | 4.65 |

About 50 g of the subject aluminosilicate having a Si/Al ratio of about 1.18 was reacted with 126c of 1M $Na_6ZnO_4$ solution at 100° C. for about 64.5 hours. A mother liquor containing the zincoaluminosilicate of the FAU structure was obtained. The solid was recovered from the liquor by filtration and was washed sparingly with 0.1M NaOH. An X-ray diffraction pattern of the solid was shown to be consistent with the FAU structure. The composition obtained was $Na_{1.01}[Si_{1.02}Al_{0.95}Zn_{0.03}]O_4$.

EXAMPLE 5B

Preparation of $Li_{1.00}[Si_{1.01}Al_{0.96}Zn_{0.03}]O_4$

To evaluate adsorption properties the sodium zincoaluminosilicate of Example 5A was exchanged with LiCl by slurrying about 30 g with 25 cc/g 1.4M LiCl solution which was pH adjusted with LiOH to give a final pH of about 8. The exchange procedure was carried out a total of 5 times. The solid was washed after each contact with deionized water with a pH of about 8, adjusted with LiOH. After the final exchange, the elemental composition was determined. Gas capacities for $N_2$ and $O_2$ in mmoles/g were determined using a standard volumetric unit at 23° C.

The adsorptive capacities of the composition of Example 5B are presented in Table IV. The data for Example 5B demonstrate that the enumerated composition in the lithium form provides over three times the nitrogen capacity than can be achieved by the lithium exchanged composition of Example 3B which was prepared by exchanging the sodium form of a zincoaluminosilicate presented in EP-A-0476901 with lithium by conventional techniques. Therefore, one of ordinary skill in the gas separation art would not lead to substitute the zinc-containing molecular sieves of EP-A-0476901 for conventional known aluminosilicates for use in adsorptive gas separation processes.

TABLE IV

Adsorption capacities and compositions of Examples 5A and 5B

| Example | Ion Form | x | y | $M^+$ | $N_2$ | $O_2$ |
|---------|----------|-------|------|-------|-------|-------|
| 5A | Na | 0.030 | 0.95 | 1.01 | | |
| 5B | Li | 0.030 | 0.96 | 1.00 | 1.41 | 0.217 |

EXAMPLE 6A

Preparation of $Na_{1.00}[Si_{1.04}Al_{0.92}Zn_{0.04}]O_4$ Using the Post Modification Method With Base Washing Step This example illustrates a composition of the present invention which was prepared using the post-modification method and base washing step. A gel having the composition, 5.25 $Na_2O:Al_2O_3:3.0\ SiO_2:200\ H_2O$ ($Na_2O/SiO_2=1.75$, $H_2O/Na_2O=38$), was prepared by dissolving 14.32 g sodium aluminate (28.61% Al and 30.91% Na) and 6.14 g 97% NaOH in 74.5 g deionized water. This solution was added to a solution of 48.37 g $Na_2SiO_3·5\ H_2O$ dissolved in 175 g deionized water. A gel formed when the two solutions were mixed together. The gel was homogenized by shaking, was crystallized at 100° C. for 18 hours, and was washed with deionized water and dried. An X-ray diffraction pattern consistent with the FAU structure was obtained. A $^{29}Si$ NMR spectrum was taken and the results are summarized below.

Summary of $^{29}Si$ NMR data for Example 6A

| Si/Al | Si(4Al) | Si(3Al) | Si(2Al) | Si(1Al) | Si(0Al) |
|-------|---------|---------|---------|---------|---------|
| 1.20 | 62.88 | 20.04 | 5.76 | 3.34 | 5.72 |

About 30 g of the Na aluminosilicate was combined with 75 ml of 1M $Na_6ZnO_4$. The mixture was crystallized at about 70° C. for 66 hours. At that time a mother liquor containing a sodium zincoaluminosilicate was formed. The solid was separated from the liquor by vacuum filtration and washed with 0.02M NaOH. An X-ray diffraction pattern consistent with FAU structure was obtained having no other crystalline or amorphous phases. Elemental analysis gave a composition according to Formula I as:

$Na_{1.0}Si_{1.04}Al_{0.92}Zn_{0.04}O_4$.

EXAMPLE 6B

Preparation of $Li_{0.86}[Si_{1.04}Al_{0.92}Zn_{0.04}]O_4$

The example presents a procedure for exchanging the zincoaluminosilicate of Example 6A with lithium chloride. The lithium exchanged composition was prepared by combining 8.0 g of the product of 6A with 200 cc of 2M LiCl which was adjusted to a pH of about 8 using LiOH. The mixture was heated at 100° C. overnight. The solid was recovered from the solution by vacuum filtration and washed with deionized water. The procedure was repeated a total of 3 times. After the fifth exchange, the composition of the solid was determined. The Li zincoaluminosilicate had a composition of $Li_{0.86}Si_{1.04}Al_{0.92}Zn_{0.04}O$. The adsorption properties were determined as described in Example 3B and the results are summarized in Table V.

EXAMPLE 7A (Comparative)

Preparation of $Na_{0.92}[Si_{1.08}Al_{0.92}Zn_0]O_4$

A sodium aluminosilicate of the prior art was prepared by reacting 2.67 g of a commercial Na X (Si/Al=1.25, Na/Al=0.96) obtained from Union Carbide Corporation with a mixture containing 3.86 g 97% NaOH, 3.07 g 87.4% KOH, 0.42 g 51% $Al_2O_3$, which was dissolved in 13.14 g deionized water. This mixture was allowed to stand at room temperature for 22 hours. The solid was recovered from the resulting solution by vacuum filtration and washed with deionized water. An X-ray diffraction pattern consistent with the FAU structure was obtained. A $^{29}Si$ NMR was obtained and the results are summarized below. The NMR showed that the number of Si with no Al next nearest neighbors, Si(0Al) was less than those Si atoms with 1 Al next nearest neighbors and 3 Si next nearest neighbor, Si(1Al).

| Si/Al | Si(4Al) | Si(3Al) | Si(2Al) | Si(1Al) | Si(0Al) |
|-------|---------|---------|---------|---------|---------|
| 1.12 | 70.3 | 20.0 | 6.2 | 3.0 | 0.4 |

EXAMPLE 7B (Comparative)

Preparation of $Li_{0.86}[Si_{1.08}Al_{0.92}Zn_0]O_4$

The example presents a procedure for exchanging the aluminosilicate of Example 7A with lithium chloride. The lithium exchanged composition was prepared by Slurrying 3.5 g of the Na X product of 7A in 12.5 cc/g of a 2M LiCl solution which was pH adjusted to about 8 with LiOH. The slurry was heated at 100° C. overnight, at which time it was filtered and washed with about 200 cc of deionized water, that was pH adjusted to about 8 with LiOH. This procedure was repeated a total of 5 times. The lithium form of the aluminosilicate had a composition of $Li_{0.86}Al_{0.92}Si_{1.08}O_4$. This material was activated for gas adsorption testing and tested according to Example 3B.

Table V compares the adsorptive data obtained using the compositions of the present example and Example 6B. These data clearly indicate that the adsorption performance of the zincoaluminosilicates of the present invention exhibit superior nitrogen adsorption capacities as compared to conventional X-type zeolites. It is also important to note that the oxygen capacities are similar for the X-type zeolite and the zincoaluminosilicate of the present invention. One skilled in the art of gas adsorption would appreciate that a gain in the adsorption capacity of the more strongly adsorbed component in a gas mixture with no similar gain in the less strongly adsorbed component would increase the selectivity at equilibrium. Thus, process efficiency is increased.

The adsorptive capacities of the composition of Examples 6B and 7B are presented in Table V. The data for Example 6B demonstrate that the enumerated composition in the lithium form provides more than a ten percent increase in nitrogen capacity with no substantial change in oxygen capacity compared to Example 7, thus providing a more nitrogen selective adsorbent for air separation processes.

TABLE V

Adsorption capacities and compositions of Examples 6B and 7B

| Example | Ion Form | x | y | M+ | $N_2$ | $O_2$ |
|---|---|---|---|---|---|---|
| 6B | Li | 0.04 | 0.92 | 0.86 | 1.29 | 0.20 |
| 7B | Li | 0 | 0.92 | 0.86 | 1.02 | 0.20 |

$N_2$ and $O_2$ are in millimoles/g @ 23° C., 1 atmosphere

EXAMPLE 8 (Comparative)

Preparation of $Ca_{0.50}[Si_{1.0}Al_{1.0}]O_4$

Na, K LSX was prepared according to the procedures of Kuehl (Kuehl, G. H. Zeolites, 1987, 7, 451–7). The Si/Al ratio was 1.01, Na/Al ratio was 0.75, and the K/Al ratio was 0.24. About 5 g of this material was combined with 250 cc of 2M $CaCl_2$ solution and heated at 100° C. overnight. The solid was separated from the solution by vacuum filtration and washed with deionized water. This exchange procedure was repeated a total of 5 times. The elemental composition of the product was determined by AA/ICP, and the results are listed in Table X. The adsorption properties were measured according to the procedure of Example 3B, except that the material was heated to 650° C. rather than 400° C.

EXAMPLE 9

Preparation of $Ca_{0.50}[Si_{1.0}Al_{0.95}Zn_{0.5}]O_4$ Using Post-Modification Method With Base Washing Step This example presents a composition of the present invention prepared using the post-modification method and a base washing step followed by calcium exchange. The aluminosilicate having the FAU structure used as the starting material for the post modification was prepared by making a gel having the composition of 3.9 $Na_2O:Al_2O_3$: 3.0 $SiO_2$:148.2 $H_2O$ (the $Na_2O:SiO_2$ ratio was 1.3 and $H_2O/Na_2O$ was 38). This was accomplished by dissolving 42.50 g sodium aluminate (28.97% Al, 28.47% Na, 5.85% $H_2O$) and 17.74 g 97% NaOH in 447.2 g deionized water. The mixture gave a clear solution upon shaking. A mixture of 41.11 g silicic acid (99% $SiO_2$), 33.97 g 97% NaOH and 147.0 g deionized water was prepared and added to the aluminate solution. A gel formed, and it was homogenized by shaking. The gel was crystallized at 100° C. for about 19 hours. At that time the solid was recovered by vacuum filtration, and washed with deionized water. An X-ray diffraction pattern was obtained which was consistent with the FAU structure. The product composition was determined by AA/ICP and was found to be $Na_{0.86}Al_{0.89}Si_{1.11}O_4$.

To prepare the corresponding sodium zincosilicate, about 50.0 g of this solid was reacted with 125 cc 1M $Na_6ZnO_4$ and heated at 75° C. for 4 days. The solid was separated from the mother liquor by centrifugation, and washed with 0.1M NaOH. This centrifugation procedure was repeated a total of 3 times, and the solid was allowed to air dry. An X-ray diffraction pattern was obtained on the solid, and it was found to be consistent with the FAU structure. Elemental composition gave the following according to Formula I: $Na_{0.97}[Si_{1.03}Al_{0.92}Zn_{0.04}]O_4$.

This Na zincoaluminosilicate was exchanged into the Ca form and its adsorption properties were tested. This was done by mixing about 8.0 g of the Na zincoaluminosilicate with 800 cc of 0.25M $CaCl_2$ solution and heating the mixture overnight at about 50° C. The solid was separated from the liquid using vacuum filtration and washed with deionized water. The exchange procedure was repeated a total of 3 times. The composition of the Ca zincoaluminosilicate was determined and the results are listed in Table VI. The adsorption properties were determined as described in Example 3B, and are also listed in Table VI.

TABLE VI

Adsorption capacities and compositions of Examples 8 and 9

| Example | x | y | M = $Ca^{2+}$ | $N_2$ | $O_2$ |
|---|---|---|---|---|---|
| 8 | 0 | 1.0 | 0.50 | 1.60 | 0.40 |
| 9 | 0.05 | 0.95 | 0.50 | 1.60 | 0.40 |

This example illustrates that the Zn adds charge to the framework as evidenced by the fact that the Ca to Zn+Al ratio is equal to 1.0. One skilled in the art of gas separations and adsorption would also recognize that if only Ca were associated with Al then less would be present and the adsorption capacity for $N_2$ would be less. This illustrates the utility of these zincoaluminosilicate compositions for gas separations since they have comparable properties to aluminosilicates at similar cation contents.

EXAMPLE 10

Binary Adsorption Data Derived from Example 5B

Using binary mixtures of nitrogen and oxygen, the adsorption capacities on activated adsorbents were measured using a closed volumetric system equipped with a pressure transducer. Binary gas mixtures of nitrogen and oxygen of known composition and pressure were circulated over the adsorbent bed in a closed loop until equilibrium was established. The sample loop and adsorbent bed were maintained at constant temperature using an external temperature bath. Once equilibrium was achieved the final pressure and composition were determined. All gas analyses were done using a gas chromatograph containing a 5A molecular sieve column equipped with a thermal conductivity detector which was calibrated using five gas standards of relevant composition. Given the initial and final compositions and pressures, the amount adsorbed is calculated directly from the mass balance in the system. The gas phase densities were calculated by the virial equation which is accurate to better than 0.1% for the conditions used. Based on reproducibility studies the pooled standard deviation over the range of conditions measured for samples having similar selectivities was found to be 0.17 meaning that for any single measurement the error at 95% confidence is less than 4%.

Table VII demonstrates that the measured binary selectivity for the composition according to Example 5B is unexpectedly high given that the lithium content of the composition of Example 5B is about equal to the lithium content achieved in lithium X-type adsorbents of the prior art. The adsorbents of the present invention demonstrate superior results because Applicants' compositions contain an amount of framework zinc which is unachievable using preparative methods of the prior art. Moreover, this result cannot be achieved by merely exchanging the zinc containing aluminosilicates of the prior art with lithium.

TABLE VII

| | | Binary Selectivity | | | |
|---|---|---|---|---|---|
| Example | Ion Form | x | y | M+ | α |
| 5B | Li | 0.030 | 0.96 | 1.00 | 9.5 |

α is measured @ 23° C., 1 atmosphere, at a gas mixture composition of 21.5% $O_2$, 78.5% $N_2$.

Typically, the zeolites of the present invention are synthesized in the sodium cation form. For air separation utility, it is desirable to cation exchange the zeolite with lithium cations, preferably to at least 80% of the available exchangable cations, more preferably 85%. The cation exchange can be a binary or tertiary exchange of cations resulting in mixtures of lithium and other monovalent, bivalent or trivalent cations, such as: cobalt, copper, chromium, iron, manganese, nickel, zinc, calcium, strontium, magnesium, barium, aluminum, cerium, scandium, gallium, indium, yttrium, lanthanum and mixed lanthanides. In the case of a binary exchange of the zeolite with lithium and another cation, the cation content is preferably, 50 to 95% lithium and 5 to 50% of a second cation, more preferably, 70 to 90% lithium and 30 to 10% of a second cation.

The zincoaluminosilicates of the present invention can be used in any conventional adsorptive air separation process currently in use. Such processes generally use switching parallel-connected beds of adsorbent wherein the steps of adsorption at elevated pressure, depressurization, evacuation and repressurization occur with or without additional steps of pressure equalization, countercurrent purge, and repressurization with feed, product and various combinations of feed and product. Such air separation process are typically conducted at −100° C. to 100° C., preferably, 0° C. to 50° C.

Preferably the more strongly adsorbed gas is nitrogen and the more weakly adsorbed gas is oxygen. Preferably the gas mixture is air. Preferably the adsorption is carried out at a pressure in the range of 10 to 30 psia and the desorption is conducted at a pressure of 0.1 to 7 psia. Preferably, the gas containing the less strongly adsorbed gas and depleted in the more strongly adsorbed gas is at least 90% $O_2$ by volume, and more preferably 93% $O_2$ by volume.

The present invention has been set forth with regard to several preferred embodiments, however the full scope of the present invention should be ascertained from the claims which follow.

We claim:

1. A method of separating a more strongly adsorbable component from one or more less strongly adsorbable components residing in a gaseous mixture comprising contacting the gaseous mixture at elevated pressure with a composition and adsorbing said more strongly adsorbed gas specie on the composition wherein the composition is represented by the formula

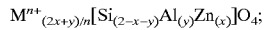

wherein

M is a cation selected from Groups 1, 2, 7, 10, 11, 12 and the f Block elements as defined by the Periodic Table of the elements as adopted by IUPAC;

n is the valence of the selected cation; M;

x is greater than or equal to 0.02 but less than or equal to 1;

y is a value greater than or equal to 0.98; and

2x+y is greater than or equal to 0.80 wherein the composition of matter has a FAU structure and zinc resides in tetrahedral positions in the framework of the FAU structure.

2. A method of separating a more strongly adsorbable component from one or more less strongly adsorbable components residing in a gaseous mixture comprising the steps of:

a) contacting the gaseous mixture with a composition at a pressure above ambient and adsorbing the more adsorbable component onto the compositions while allowing the less strongly adsorbable components to be recovered as an unadsorbed product;

b) terminating contact of the gaseous mixture onto the composition and reducing the pressure on the composition thereby desorbing the more strongly adsorbable component;

c) repressurizing the composition and d) repeating steps a)–c) to provide a continuous process wherein the composition is represented by the formula

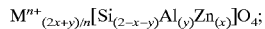

wherein

M is a cation selected from Groups 1, 2, 7, 10, 11, 12 and the f Block elements as defined by the Periodic Table of the elements as adopted by IUPAC;

n is the valence of the selected cation; M;

x is greater than or equal to 0.02 but less than or equal to 1;

y is a value greater than or equal to 0.98; and

2x+y is greater than or equal to 0.80 wherein the composition of matter has a FAU structure and zinc resides in tetrahedral positions in the framework of the FAU structure.

3. The method of claim 2 wherein the composition is cation exchanged with lithium cations to replace at least 50% of the exchangeable cations in the composition.

4. The method of claim 3 wherein said more strongly adsorbable component is nitrogen and one of the less strongly adsorbable components is oxygen.

5. The method of claim 2 wherein the gaseous mixture is air.

6. The method of claim 2 wherein the adsorbent is contained in a plurality of parallel connected adsorption vessels and the steps are performed within each vessel so that when at least one vessel is undergoing step a), at least one other vessel is undergoing steps b) and/or c).

* * * * *